United States Patent
Singla et al.

(10) Patent No.: US 7,200,692 B2
(45) Date of Patent: Apr. 3, 2007

(54) PVDM (PACKET VOICE DATA MODULE) GENERIC BUS

(75) Inventors: Ankur Singla, San Jose, CA (US); Stephen Davies, San Jose, CA (US); David Fermor, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 10/798,514

(22) Filed: Mar. 10, 2004

(65) Prior Publication Data

US 2005/0216609 A1    Sep. 29, 2005

(51) Int. Cl.
*G06F 13/00* (2006.01)
(52) U.S. Cl. .................. 710/22; 710/19; 710/5; 710/308; 709/208
(58) Field of Classification Search ............... 710/5–7, 710/15–19, 22–29, 308; 709/211; 370/419, 370/352, 494
See application file for complete search history.

(56) References Cited

U.S. PATENT DOCUMENTS

| | | | | |
|---|---|---|---|---|
| 5,257,374 | A | * 10/1993 | Hammer et al. | 718/105 |
| 5,822,618 | A | * 10/1998 | Ecclesine | 710/57 |
| 6,947,931 | B1 | * 9/2005 | Bass et al. | 707/6 |
| 6,956,862 | B2 | * 10/2005 | MacKnight | 370/419 |
| 2003/0031208 | A1 | * 2/2003 | Anehem et al. | 370/474 |
| 2005/0117565 | A1 | * 6/2005 | MacKnight | 370/352 |
| 2005/0213570 | A1 | * 9/2005 | Stacy et al. | 370/389 |

OTHER PUBLICATIONS

INTEL, "Host Bus Adapter Considerations with the Intel 80314 I/O Processor Companion Chip," Application Note, Feb. 2004, 6 pages, downloaded from the Internet: <http://www.intel.com/design/iio/applnots/27404802.pdf>.

* cited by examiner

*Primary Examiner*—Christopher Shin
(74) *Attorney, Agent, or Firm*—Charles E. Krueger

(57) ABSTRACT

A generic, parallel, n-bit wide data path communication bus allows a number of major slave devices (such as DSPs, Microprocessors, ASICs, FPGAs, etc) to be used with PVDMs and other devices. A higher level protocol allows a DMA engine to interface multiple Master devices directly with multiple slave modules through the DMA engine.

11 Claims, 5 Drawing Sheets

Source Synchronous - Daisy Chain Load Topology

PVDM (PACKET VOICE DATA MODULE) GENERIC BUS

BACKGROUND OF THE INVENTION

Routing platforms include a motherboard having a host processor and various slave devices such as Digital Signal Processors (DSPs), Microprocessors, Application Specific Integrated Circuits (ASICs), and Field Programmable Gate Arrays (FPGAs). Also, many motherboards include a slot for holding a Packet Voice Data Module (PVDM).

Communication between the host processor and the slave devices is generally accomplished utilizing proprietary, specialized interfaces for each device. For example, some devices have proprietary interfaces, others have synchronous or non-synchronous interfaces. Additionally, direct communication between slaves without host processor intervention has not been available.

Another problem has been facilitating host processor transfers to large memories controlled by the slave devices. It is not practical for the host processor to map each of these slave spaces.

Accordingly, a generic bus system providing efficient communication between the host processor and slave modules, efficient memory usage, and inter-slave communication is required.

BRIEF SUMMARY OF THE INVENTION

In a first embodiment of the invention, a new protocol and interface specification allows for transactions with existing and future slave devices. The protocol and interface specification allows for interaction with complex slave devices such as modems, CPUs, Microcontrollers, etc.

In another embodiment of the invention, a DMA engine is provides a Master with the capability of accessing a slave using either a direct access method or an indirect access method.

In another embodiment of the invention, all data is transferred between the DMA engine and mailbox registers on the slave utilizing a PVDM generic bus protocol.

In another embodiment of the invention, the DMA engine provides the Master the capability of performing single word accesses to the addressable region of a slave device.

In another embodiment of the invention, direct communication between slave devices in made available by the interface.

In another embodiment of the invention, during startup the DMA engine negotiates with the slaves to determine a desired operating mode of communication including bus width and asynchronous/synchronous mode operation.

Other features and advantages of the invention will be apparent in view of the following detailed description and appended drawings.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

In one embodiment of the invention, referred to below as a PVDM n Interface that defines a Generic Bus Protocol (PGBP), a generic parallel, n-bit wide data path communications bus is defined to allow a number of major Slave devices (DSPs, Microprocessors, Application Specific ICs/ FPGAs) to be used to interface with a generic PVDM module. The bus itself has no parity or CRC hardware data integrity checking. Although, we allow for CRC/parity extensions to be provided in the messages. Higher level protocol allows a DMA engine to interface multiple master devices (Host Processor, etc) to interface directly with multiple PVDM modules through the DMA (Direct Memory Access) engine.

The embodiment being described provides the following features:

Ultra-High-speed source synchronous, High-speed synchronous and Low-speed asynchronous modes. Synchronous speed will vary depending on the load of the modules sharing the bus. Bus start in asynchronous mode with bus mode discovery enabled.

n-bit bidirectional parallel data bus, with bus width discoverable mode

Message/Frame passing interface

MSI (Message Signaled Interrupts)

Support for multiple masters through Message Passing interface

Expandable support for 32 or more slave registers per device

Each of these features will be described in detail below.

The PVDM-n Interface provides the host processor (Master device) a method of sending and receiving data from slave device(s) on the PVDM modules. This interface appears to the host as a contiguous block of memory and all address translation and master device selection is handled by the DMA engine. In the following, transfers from the DMA to slave are termed Egress transfers and transfers from the slave to the DMA are termed Ingress transactions.

Figure 1:
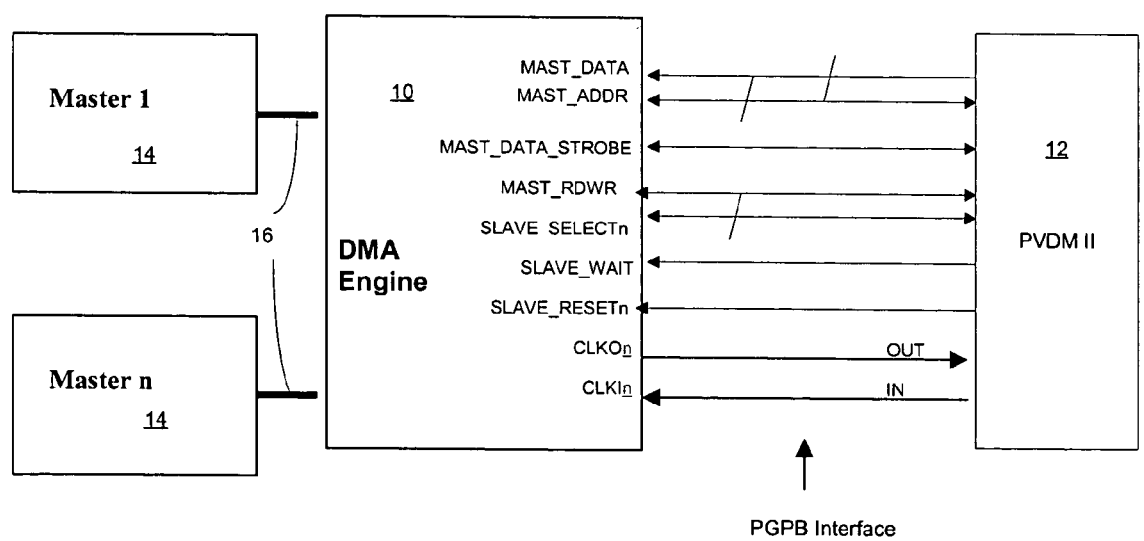
FIG. 1 is a block diagram of a DMA coupled to a PVDM utilizing an interface which is one embodiment of the invention.
Figure 2:
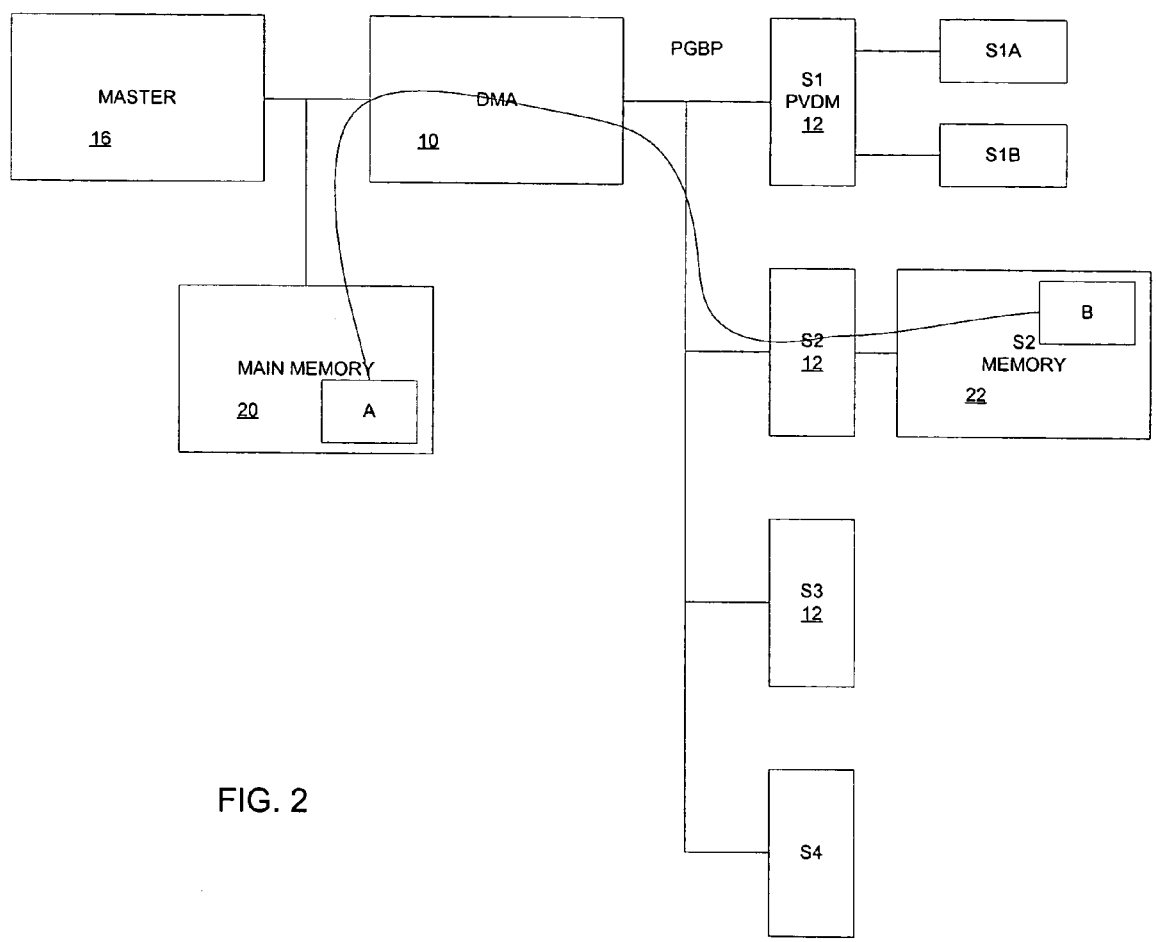
FIG. 2 is a block diagram depicting multiple slaves coupled to the PGBP.
Figure 3:
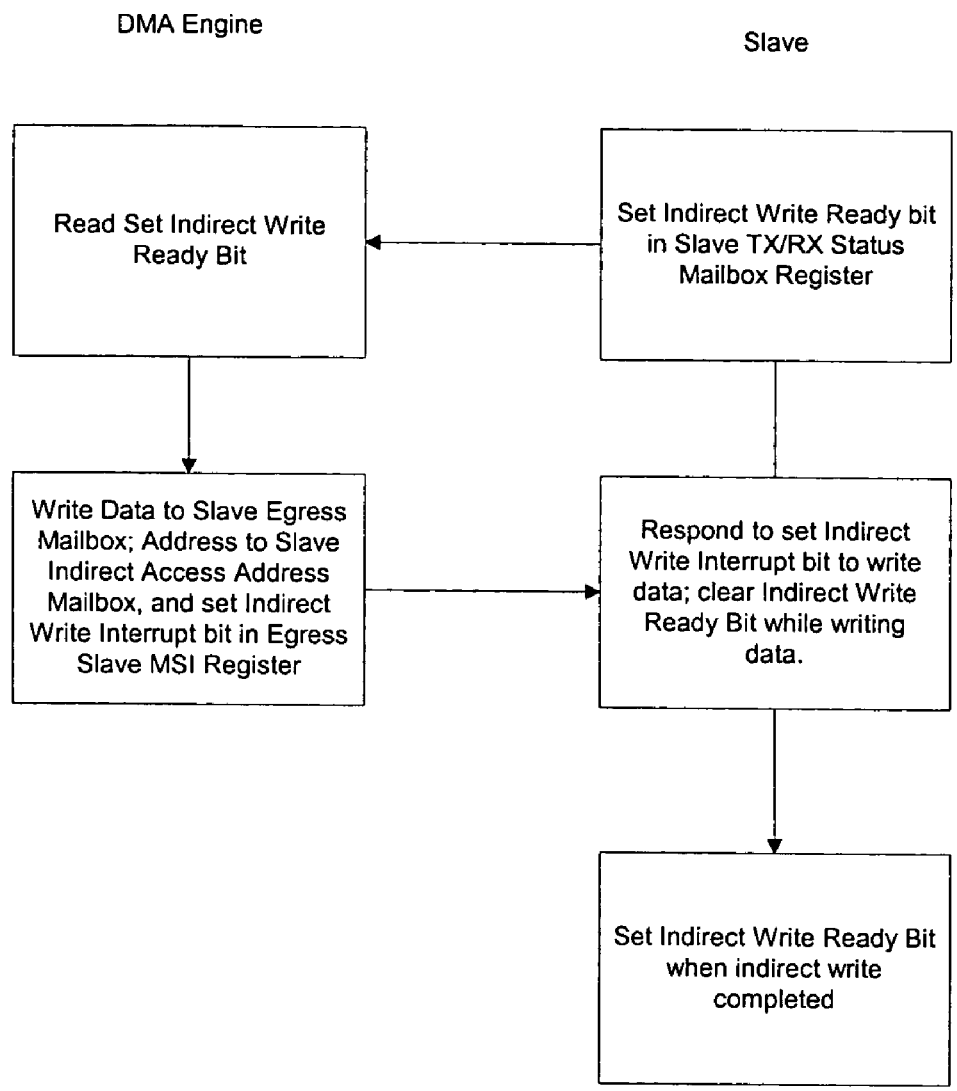
FIG. 3 is a flow chart depicting the steps employed by an embodiment of the invention when an indirect write transaction is performed.
Figure 4:
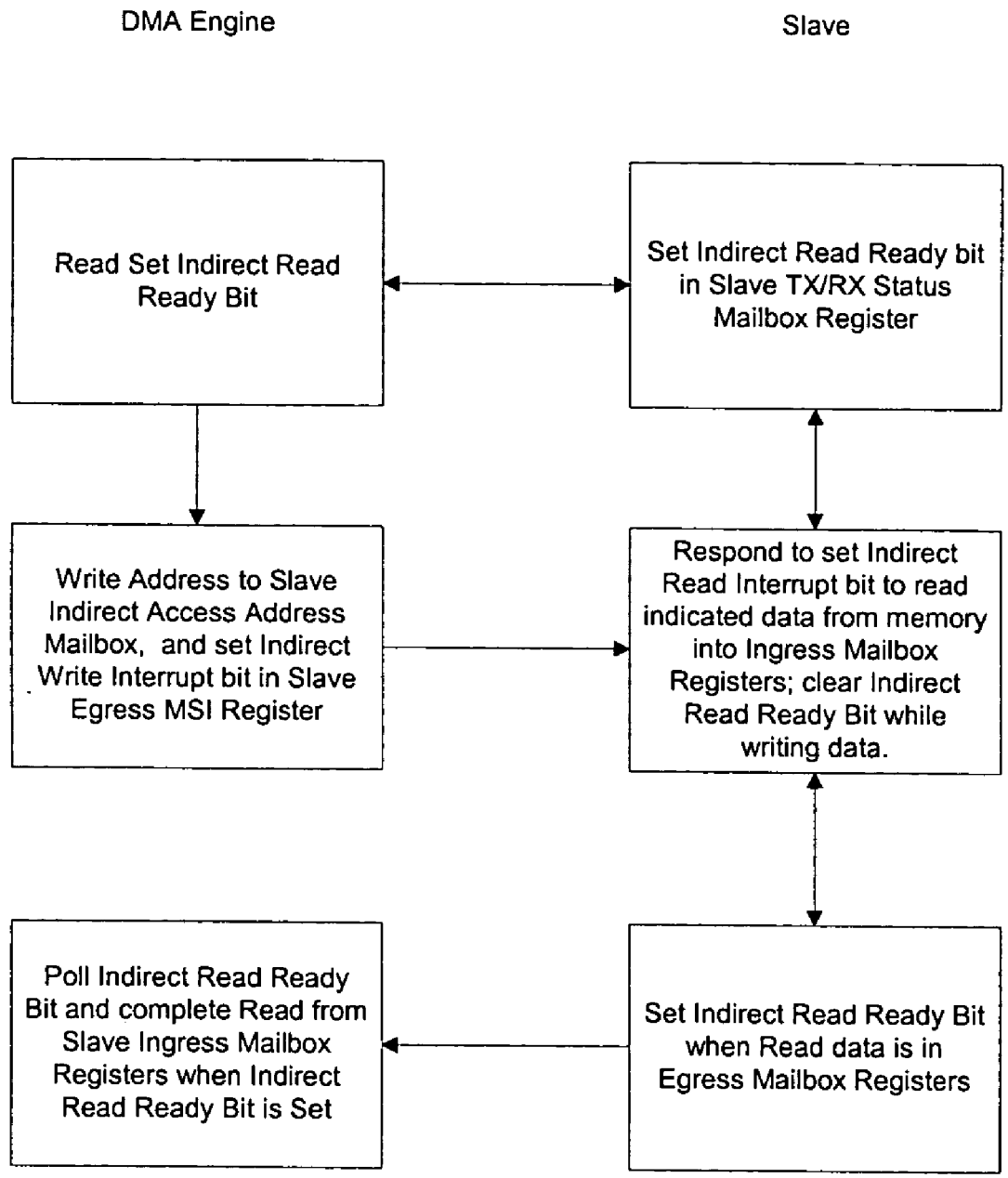
FIG. 4 is flow chart depicting the steps employed by an embodiment of the invention when an indirect read transaction is performed.

FIG. 1 is a block diagram depicting the PGBP interface in this embodiment. In FIG. 1 a DMA engine 10 is coupled to a slave (PVDM II) 12 by the PGPB Interface. A plurality of Masters 14 are coupled to the DMA engine 10 by a Master Interface Bus 16. As is known in the art the Master Interface Bus may be a PCI Bus, Hyper-Transport Bus, PCI-X Bus, or other buses in digital systems. In FIG. 1 only a single PVDM slot is depicted as being coupled to the PGPB Interface. However, as depicted in FIG. 2, multiple PVDM slots and slave devices can be coupled to the interface. FIG. 2 also depicts the addressable memory region 20 of the Master 14 and the addressable memory region 22 of the second slave S2.

The following Table describes the pin functions of the PGBP interface:

| NAME | #PINS | DIRECTION | DESCRIPTION |
|---|---|---|---|
| MAST_DATA[n:0] | n(16/32/etc) | I/O/Z | n-bit parallel data bus. Protocol allows this bus to be used as multiplexed Address/Data Bus to provide access to greater memory allocation within the Slave device. Pull up resistors are recommended on the DMA engine or the motherboard. |
| MAST_ADDR[m:0] | m | I | m-bit address bus. This address bus provides access to slave device interface registers. Most of the registers are used as Mailbox/FIFO to transfer messages between the master and the slave. If MAST_DATA[n:0] is used in multiplexed mode, then these address bus need not be present. |
| MAST_RDWR | 1 | I | Master Read Write Signal. High - Read of Slave Device Low - Write to Slave Device |
| MAST_DATA_STROBE | 1 | O | Synchronous Data Valid Enable in Synchronous Mode. Data Valid Latch Enable in Asynchronous mode. DMA Engine guarantees valid data on MAST_DATA on the falling edge of Data Strobe. DMA Engine expects to sample valid data on MAST_DATA on the rising edge of Data Strobe. |
| SLAVE_WAIT | 1 | O | Slave indication to Master that it is not ready to receive data. Whenever the signal is asserted by the Slave, the Master is obliged to wait till the signal is de-asserted before continuing read/write transaction. |
| SLAVE_SELECTn | n | I | Slave Select Signal from the DMA engine to Slave Device indicating slave device selection. |
| CLKOn | n | O | CLKO Signal. The clock output signal definition will depend on the negotiated configuration capabilities of the interface. The CLK signal is not required in asynchronous mode and is optional in Synchronous mode providing the external system provides the clock to each module. The CLK signal is mandatory for source-sync operation. |

-continued

| NAME | #PINS | DIRECTION | DESCRIPTION |
|---|---|---|---|
| CLKIn | n | I | CLKI Signal. The clock input signal definition will depend on the negotiated configuration capabilities of the interface. The CLKI signal is not required in asynchronous mode or in Synchronous. The CLKI signal is mandatory for source-sync operation. |
| RESET | 1 | I | Reset Signal |

As depicted in FIG. 2, multiple slaves may be accessed through a single PVDM module. An interface for accessing multiple slaves through a single PVDM, denoted in this specification as a PVDM-II module, is disclosed in a copending, commonly assigned patent application entitled METHOD AND APPARATUS TO COMBINE HETEROGENEOUS HARDWARE INTERFACES FOR NEXT GENERATION PACKET VOICE MODULE DEVICES, application Ser. No. 10/725,691, filed Dec. 2, 2003, which is hereby incorporated by reference for all purposes.

Thus, for the PVDM interface with two slaves, 2 SLAVE_SELECT lines are required to select either S1A or S1B. Other slave devices can be selected utilizing a single SLAVE_SELECTn line.

Each slave interfaces to the PGBP through a set of mailbox registers including a Slave RX/TX Status Register, a Slave Egress MSI (Message Signal Interrupts) Register, Slave Egress Mailbox Registers, Slave Ingress Mailbox Registers, and Slave Indirect Access Address Registers. Each of these registers will be described in more detail below.

The master device can communicate with the Slave Device using 32 Mailbox Registers (expandable depending on address bits availability). These registers provide capability of fast transactions into the Memory Space of the Slave Device and also allow for reading/writing to a larger Slave Memory Space through Address Mailbox Register. To allow support for current modules that only provide 4 bit address support, the fifth address bit is obtained from the MAST_RDWR signal. This provides slaves capability of 16 write-only and 16 read-only registers. Any register that needs to be read/write will be shadowed internally within the Slave.

Messages/Frames are transferred to/from the slave devices by the DMA engine using the mailbox scheme.

The following are detailed descriptions and memory maps of the registers required in a slave device to interface with the PGBP of this embodiment:

| Addr | Name | Description | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| 0x00 | RSVD | Reserved | Reserved ||||||||||||||||
| 0x01 | EMR | Egress MSI | Reserved ||||| IRI | IWI | EFW | Reserved ||| EMID |||
| 0x02 | XSR | Rx/Tx Status | IMID ||| Reserved || IWR | IRR | ERR | ES1 | ES2 | IRC | IWC | IMA |
| 0x03 | IMS | Ingress Message Size | Ingress Message Size Register ||||||||||||||||
| 0x04 | MM3 | Message Mailbox 3 | Ingress/Egress Message Mailbox Reg3 bits[63:48] MSB ||||||||||||||||
| 0x05 | MM2 | Message Mailbox 2 | Ingress/Egress Message Mailbox Reg2 bits[47:32] ||||||||||||||||
| 0x06 | MM1 | Message Mailbox 1 | Ingress/Egress Message Mailbox Reg1 bits[31:16] ||||||||||||||||
| 0x07 | MM0 | Message Mailbox 0 | Ingress/Egress Message Mailbox Reg0 bits[15:0] LSB ||||||||||||||||
| 0x08 | RSVD | Reserved | Reserved ||||||||||||||||
| 0x09 | RSVD | Reserved | Reserved ||||||||||||||||
| 0x0A | RSVD | Reserved | Reserved ||||||||||||||||
| 0x0B | RSVD | Reserved | Reserved ||||||||||||||||
| 0x0C | IA0 | Indirect Access Address 0 | Indirect Access Address Register 0 bits[15:0] LSB ||||||||||||||||
| 0x0D | IA1 | Indirect Access Address 1 | Indirect Access Address Register 1 bits[31:16] ||||||||||||||||
| 0x0E | IA2 | Indirect Access Address 2 | Indirect Access Address Register 2 bits[47:32] ||||||||||||||||
| 0x0F | IA3 | Indirect Access Address 3 | Indirect Access Address Register 3 bits[63:48] MSB ||||||||||||||||

The Slave Egress MSI Register (EMR) is used by the master device to interrupt the slave device and perform the appropriate action based on the asserted fields.

| Field | Mask | Read/Write | DESCRIPTION |
|---|---|---|---|
| EMID: Egress Master ID | 0x0007 | Write | ID of the Master that originated the Egress Message |
| RSVD: Reserved | 0x0078 | Write | Reserved for individual device implementation. |
| EFW: Egress Frame Written | 0x0080 | Write | Egress Frame has been written to Slave Device (Interrupt) 1 - (Asserted by Host) Egress Frame Written 0 - (Deasserted by Slave) Egress Frame has been serviced |
| IWI: Indirect Write Interrupt | 0x0100 | Write | Completion of write to the Egress Message Mailbox and Slave Indirect Access Address Registers. Initiate the Write operation within the slave device |
| IRI: Indirect Read Interrupt | 0x0200 | Write | Completion of write to the Slave Indirect Access Address Registers. Initiate the Read operation within the slave device |
| RSVD: Reserved | 0xFC00 | Write | Reserved for individual device implementation. |

The Slave RX/TX Status Register (XSR) informs the status of various conditions within the Slave Device. It is a READ ONLY register from the DMA engine/Master device.

| Field | Mask | Read/Write | DESCRIPTION |
|---|---|---|---|
| IMA: Ingress Message Available | 0x0001 | R | This bit informs the DMA engine/Master device that the Slave device has a message available in the internal queue. 1 (Asserted) - Ingress Data Available 0 (De-asserted) - No Ingress Data in Slave |
| IWC: Indirect Write Completed | 0x0002 | R | Completion of Indirect Write |
| IRC: Indirect Read Completed | 0x0004 | R | Completion of Indirect Read |
| ES2: Egress Space ×2 Available | 0x0008 | R | Egress Space for two MAXSIZE messages (typically 1500 bytes) is available on Slave |
| ES1: Egress Space ×1 Available | 0x0010 | R | Egress Space for one MAXSIZE message (typically 1500 bytes) is available on Slave |
| ERR: Slave Error | 0x0020 | R | An error has occurred on the PGBP Slave. |
| IRR: Indirect Read Ready | 0x0040 | R | Informs the DMA engine/Master device that master can initiate or complete an indirect read operation. 1 (Asserted) - Slave is Idle and Ready for Read or has completed reading the data from internal memory 0 (De-asserted) - Slave is Busy reading Data |
| IWR: Indirect Write Ready | 0x0080 | R | Informs the DMA engine/Master device that master can perform an indirect write operation or has completed a recent write. 1 (Asserted) - Slave is Idle and Ready 0 (De-asserted) - Slave is Busy completing the write |
| RSVD: Reserved | 0x1F00 | R | Reserved for individual device implementation. |
| IMID: Ingress Master ID | 0xE000 | R | ID of the PGBP Master for whom the Ingress Message is intended. |

The Slave Ingress Message Size Register (IMS) is not required in this embodiment. However, they may be defined if the DMA engine/Slave require implementation of this register.

| Field | Mask | Read/Write | DESCRIPTION |
|---|---|---|---|
| Ingress Message Size | 0xFFFF | Read | Size of the Ingress Message in bytes. |

The Slave Ingress/Egress Message Mailbox Registers (MM 0–3) allow the Slave Devices for up to 64 Bit operation. If the Slave is identified for 32-bit operation, the data in the registers 2 and 3 are bypassed.

Slave Ingress/Egress Message Mailbox Register 0

| Field | Mask | Read/Write | DESCRIPTION |
|---|---|---|---|
| Data[15:0] | 0xFFFF | Write | Ingress/Egress Data to Slave Device Bits 15:0 |

Slave Ingress/Egress Message Mailbox Register 1

| Field | Mask | Read/Write | DESCRIPTION |
|---|---|---|---|
| Data[31:16] | 0xFFFF | Write | Ingress/Egress Data to Slave Device Bits 31:16 |

Slave Ingress/Egress Message Mailbox Register 2

| Field | Mask | Read/Write | DESCRIPTION |
|---|---|---|---|
| Data[47:32] | 0xFFFF | Write | Ingress/Egress Data to Slave Device Bits 47:32 |

Slave Ingress/Egress Message Mailbox Register 3

| Field | Mask | Read/Write | DESCRIPTION |
|---|---|---|---|
| Data[63:48] | 0xFFFF | Write | Ingress/Egress Data to Slave Device Bits 63:48 |

The Slave Indirect Access Address Registers (IA 0–3) allow the Slave Devices for up to 64 Bit addressed operation. If the Slave is identified for 32-bit address operation, the address in the registers 2 and 3 are bypassed.

Slave Indirect Access Address Register 0

| Field | Mask | Read/Write | DESCRIPTION |
|---|---|---|---|
| Address[15:0] | 0xFFFF | Write | Address to Slave Device Bits 15:0 |

Slave Indirect Access Address Register 1

| Field | Mask | Read/Write | DESCRIPTION |
|---|---|---|---|
| Address[31:16] | 0xFFFF | Write | Address to Slave Device Bits 31:16 |

Slave Indirect Access Address Register 2

| Field | Mask | Read/Write | DESCRIPTION |
|---|---|---|---|
| Address[47:32] | 0xFFFF | Write | Address to Slave Device Bits 47:32 |

Slave Indirect Access Address Register 3

| Field | Mask | Read/Write | DESCRIPTION |
|---|---|---|---|
| Address[63:48] | 0xFFFF | Write | Address to Slave Device Bits 63:48 |

The DMA engine provides the master with the capability of accessing the slave using two methods—direct method (also referred to as DMA access) and/or indirect method. The Direct method requires the DMA Engine to facilitate moving of complete packet data to/from the addressable memory region of the Master to/from a message passing interface/addressable memory region on the slave device. The indirect method requires the Master device to use DMA engine to perform single word accesses (read/write) in the addressable region of the slave device.

The techniques for performing direct egress and ingress accessing will be described first. In the egress direct, a transaction is performed by the DMA engine on the behalf of the master where the data is moved from the Master Device to Slave Device. Whereas, in ingress direct, a transaction is performed by the DMA engine on the behalf of the master where the data is moved from the Slave Device to Master Device. Similarly, for Indirect transactions, messages are replaced with single word message.

Egress Message Transfer—The master requests/programs the DMA engine to transfer a message to the slave device. The DMA engine polls the Slave RX/TX Status Register (Egress Space Available bits) and determines whether the slave device is ready to accept any new message. In this embodiment, the message size is application specific and is typically set to 1500 bytes. If there is enough space and the slave is ready, the DMA engine moves the message from the Master Device's addressable memory region to the Slave Device's Mailbox Registers. The transfer is performed using the physical interface operation defined in detail below.

The message payload movement is done to a set of two to four (programmable) 16-bit mailbox registers called Egress Message Mailbox Registers[0 . . . 3]. The DMA engine writes data to these mailbox registers in order 0 to 1/3 (depending on programmed value) in cyclic order [0, 1, 2, 3, 0, 1, 2, 3, . . . ] or [0, 1, 0, 1, 0, 1, . . . ]. During the data movement from the master device to the slave device, if the slave is not ready to receive further data, it can assert SLAVE_WAIT signal to indicate to the DMA engine to wait before continuation of data transfer.

Upon completion of the payload movement, the DMA engine updates the Egress MSI Register, Frame Written bit, to inform the Slave device of the completion of message transfer. Also, the DMA engine updates the ID of the master that moved the message to the slave and it asserts the Egress Interrupt Bit in the Egress MSI Register. This is to request the Slave to perform internal action on the message just transferred.

Ingress Message Transfer—The master programs the DMA engine to transfer a message from the slave device whenever the slave device has a message to send. The DMA engine continuously polls the Ingress Message Available bit in the Slave RX/TX Status Register. If this bit is set, it informs the DMA engine to move the message to the master indicated by the Ingress Master ID bits (in Slave RX/TX Status Register). The DMA engine now initiates the message transfer from the slave device to master device using the physical interface operation defined below.

The payload movement is done from a set of two to four (programmable) 16-bit mailbox registers called Ingress Message Mailbox Registers[0 . . . 3]. The DMA engine reads data from these mailbox registers in order 0 to 1/3 (depending on programmed value) in cyclic order [0, 1, 2, 3, 0, 1, 2, 3, . . . ] or [0, 1, 0, 1, 0, 1 . . . ]. If during the entire message movement, if the slave device is not ready to transfer further data, it can assert SLAVE_WAIT signal to indicate to the DMA engine to wait before continuation of data transfer. The DMA engine is required to always accept data once it initiates the message transfer.

In this embodiment, the first short-word in the payload from Slave may indicate the size of the message to be transferred from the slave. However, this is not required for the protocol to work and the ING_MESSAGE_SIZE_REG may be used by the Slave Device to indicate the transaction size.

As depicted in FIG. 2, the Slave S2 has access to its own memory space S2 MEMORY. Since this memory space is not directly memory mapped within the Master's memory space, the Master may be obliged to use the indirect access to transfer data to/from the slave memory region (S2 MEMORY)

Indirect Slave Memory Write—During an indirect slave memory write operation, the master reads the Indirect Write Ready bit held in the Slave RX/TX Status Register. This bit informs the master that it can perform an indirect slave memory write operation (using the DMA engine) If the Slave is ready for a transfer, the Master writes a 64-bit/32-bit address in the Indirect Access Address Register, writes the 64-bit/32-bit Data to the Egress Message Mailbox Registers[0 . . . 3]. Upon completion of the write to the mailbox registers, the master then writes to the Egress MSI Register, Indirect Write Interrupt bit to request the Slave to initiate the indirect write to the requested address within its memory region. Upon initiation of the write to the Egress MSI Register, the Slave Device will clear the Indirect Write Ready bit to indicate the Slave is performing the write. Once the write is completed, the Slave will re-assert the Indirect Write Ready bit in the Slave RX/TX Status Register.

Indirect Slave Memory Read—During an indirect slave memory read operation, the master reads the Indirect Read Ready bit held in the Slave RX/TX Status Register. This bit informs the master that it can perform an indirect slave memory read operation. If the Slave is ready for a transfer, the Master writes a 64-bit/32-bit address in the Indirect Access Address Register. Upon completion of the write to the address registers, the master then writes to the Egress MSI Register, Indirect Read Interrupt bit to request the slave to initiate the indirect Read to the requested address within its memory region. Upon write to the Egress MSI Register, the slave will clear the Indirect Read Ready bit to indicate the Slave is performing the read from its internal memory map and loading the values in the Ingress Message Mailbox Registers[0 . . . 3]. Once the read is completed, the Slave will re-assert the Indirect Read Ready bit in the Slave RX/TX Status Register. The master will poll for this bit to be re-asserted, once it is ready, the master can complete the Read of the Ingress Message Mailbox Registers[0 . . . 3].

Thus, as depicted in FIG. 1 the indirect access feature allows a master to transfer data between a region of main memory (A) to a region of the a desired slave memory, area (B) of S2 MEMORY without requiring the master include the slave memory in its memory space.

The present embodiment provides for direct communication between slaves without host processor involvement. For example, in FIG. 2 the second slave device S2 can communicate directly with the fourth slave device S4 by programming the DMA engine to access S4 by the direct or indirect method. The second slave S2 utilizes a Master Bus Interface (not shown) to program the DMA engine.

The DMA Engine provides support for Synchronous operation of the PGBP Bus and/or Asynchronous operation of the PGBP Bus. Synchronous operation is supported via Source-Synchronous clock operation or traditional synchronous operation. The PGBP interface allows for support of very high throughput through the multi-loaded PVDM-II module(s). Synchronous/Source-Sync operation allows up-to 100 MHz/100 MHz DDR (Double Data Rate) bus operation (depending on system architecture), providing maximum raw throughput of 1200/TBDMbps. Asynchronous operation allows interface to modules that cannot operate with minimal skew requirements of the synchronous mode. Asynchronous operation supports lower raw throughput of 300 Mbps (Practical throughput is about 75% of the theoretical number).

During the bootstrapping phase, the DMA engine operates in Asynchronous mode to allow handshaking with a low performance Slave device not capable of communicating in the Synchronous mode. This allows the DMA engine/the Host and the Slave to negotiate the desired operation mode—Source Synchronous, Synchronous, and/or Asynchronous. In addition, the DMA engine will negotiate the bus interface widths. The initial bus width is 8/16 (as hard configured in the DMA engine) but can be increased dynamically by negotiating with the slave device.

This negotiation provides great flexibility and expandability to the PGBP and allows slave devices of different capabilities regarding data transfer speed, types of system clocks, and bus width to be coupled to the PGBP of this embodiment.

Examples of hardware interfaces for implementing the Synchronous and Source Synchronous Interfaces will now be described with reference to FIGS. 5 and 6.

Figure 5:
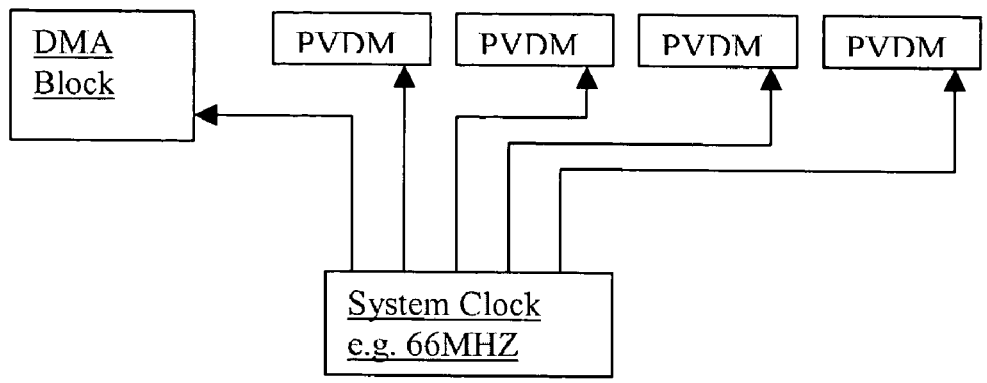
FIG. 5 depicts a system coupled in standard synchronous mode.

FIG. 5 depicts the traditional synchronous mode. In this mode an external system clock device can be used to distribute the clock to each end-point. The design becomes a standard multi-drop synchronous interface with end-point timing controlled via matched length clock distribution techniques.

Figure 6:
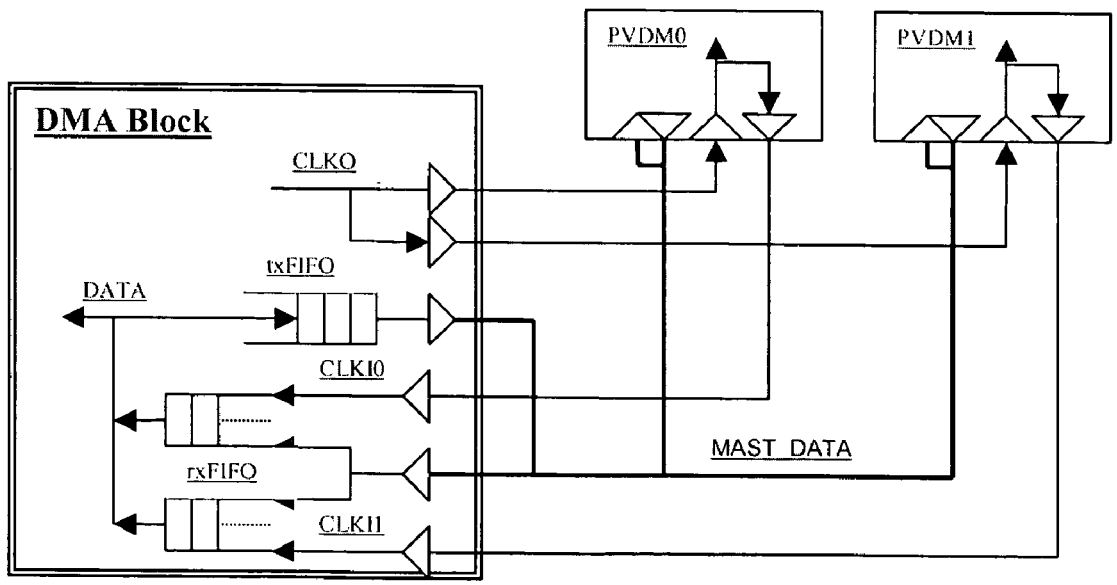
FIG. 6 depicts a system coupled in source synchronous mode.

FIG. 6 depicts the source synchronous mode. In this mode the DMA Block interface is configured to have a single clock output and a single clock input per PVDM interface. The DMA block sources data to each PVDM based on a common shared master clock. Data sourced from the PVDM is received based on individual receive clock inputs (CLKIn). The MAST_DATA bus is routed to the PVDM modules with either a daisy-chain bus or STAR topology. Each CLKOn signal is individually routed to each PVDM module with a length necessary to ensure a fixed timing relationship between the write data and the CLKOn signal edge(s). The PVDM sources the CLKIn clock, the DMA Block receives separate clocks from each PVDM which are then used to receive the data into individual read FIFOs. Note that for STAR topologies the receive clock phase relationships are identical resulting in a single read FIFO implementation. This mechanism allows for completely deterministic source synchronous behavior without the need for clock gating.

The invention may be implemented as hardware and/or program code, stored on a computer readable medium, that is executed by a digital computer. The computer readable medium may include, among other things, magnetic media, optical media, electro-magnetic fields encoding digital information, and so on.

The invention has now been described with reference to the preferred embodiments. Alternatives and substitutions will now be apparent to persons of skill in the art. For example, the particular numbers of bus lines will vary according to the requirements of a system. Also, the polling of interrupt bits can be replace by actively interrupting the DMA engine. Accordingly, it is not intended to limit the invention except as provided by the appended claims.

What is claimed is:

1. A system comprising:
   a Packet Voice Data Module (PVDM) having a set of bi-directional data inputs/outputs configured as an interface between a master device coupled to a DMA engine and a slave device having a set of addressable registers including egress mailbox registers, ingress mailbox registers, and indirect access address registers, with the interface comprising;
   a set of master address inputs configured to couple to PVDM to the DMA engine, with the master address for-transmitting address data from the DMA engine to the slave;
   a master data strobe input configured to couple the PVDM to the DMA engine, with the master data strobe for strobing data;
   a master read/write signal input configured to couple the PVDM to the DMA engine, with master read/write signal for indicating whether data is to be read from or written to the slave;
   a set of slave select signal inputs configured to couple the PVDM to the DMA engine, with slave select signals for selecting one of a plurality of slaves;
   a slave wait signal output configured to couple the PVDM to the DMA engine, with the slave wait signal asserted by a slave to delay a data transfer;
   a slave reset signal input configured to couple the PVDM to the DMA engine, with the slave reset signal resetting the slave when asserted;

a clock signal line output configured to couple the PVDM to the DMA engine and to receive a clock signal; and a clock signal line input configured to couple the PVDM to the DMA engine and to receive a clock input signal.

2. The system of claim 1 further comprising a DMA engine configured to perform direct data transfers to the slave by asserting a slave select signal to the slave and to transfer data to the slave egress or ingress data registers and to perform indirect data transfers to slave memory by writing address data to the indirect address register of the slave and to negotiate with a slave to implement either an asynchronous, synchronous, or source synchronous data transfer.

3. The system of claim 2 with the DMA engine configured to negotiate with all slaves during reset to determine a maximum bus width available to transfer data.

4. The system of claim 1 further comprising:

a slave including a status register and a message signal interrupt (MSI) register; and where the slave is configured to utilize its own memory map and the address data to transfer data between a location indicated by the address data and the DMA engine and to assert a bit in the status register to indicate it is ready for a transaction and where the DMA engine is configured to assert a bit in the MSI register to indicate when a transaction is complete.

5. A method comprising:

to implement a direct message transfer to a slave device:

accessing a slave status register to read a direct message ready status bit which is set when the slave is ready to transfer data; transferring message data using a DMA engine and a slave mailbox register if the direct message ready status bit is set;

setting a message transfer complete status interrupt at the slave to indicate when the transfer of the message is complete; and to implement an indirect data transfer to the memory space of a slave device:

accessing a slave status register to read an indirect message ready status bit which is set when the slave is ready to transfer data;

transferring address data using the DMA engine and slave indirect address mailbox register if the indirect message ready status bit is set;

setting an indirect transfer message interrupt bit at the slave to initiate the indirect transfer;

transferring message data between the DMA engine and slave mailbox registers if the indirect message ready status bit is set, where the slave utilizes its own memory map and the address data to transfer data between a location indicated by the address data and the DMA engine; and setting a message transfer complete status interrupt at the slave to indicate when the transfer of the message is complete.

6. The method of claim 5 further comprising:

negotiating with all the slaves to implement either an asynchronous, synchronous, or source synchronous data transfer.

7. The method of claim 5 further comprising:

starting the bus upon reset at a fixed bus-width and then negotiating with all the slaves to implement acceptable bus bit-width.

8. A system comprising:

means for implementing a direct message transfer to a slave device including:

means for accessing a slave status register to read a direct message ready status bit which is set when the slave is ready to transfer data;

means for transferring message data using a DMA engine and a slave mailbox register if the direct message ready status bit is set;

means for setting a message transfer complete status interrupt at the slave to indicate when the transfer of the message is complete; and means for implementing an indirect data transfer to the memory space of a slave device including:

means for accessing a slave status register to read an indirect message ready status bit which is set when the slave is ready to transfer data;

means for transferring address data using the DMA engine and slave indirect address mailbox register if the indirect message ready status bit is set;

means for setting an indirect transfer message interrupt bit at the slave to initiate the indirect transfer;

means for transferring message data between the DMA engine and slave mailbox registers if the indirect message ready status bit is set, where the slave utilizes its own memory map and the address data to transfer data between a location indicated by the address data and the DMA engine; and means for setting a message transfer complete status interrupt at the slave to indicate when the transfer of the message is complete.

9. The system of claim 8 further comprising:

means for negotiating with all the slaves to implement either an asynchronous, synchronous, or source synchronous data transfer.

10. The system of claim 8 further comprising:

means for starting the bus upon reset at a fixed bus-width and then negotiating with all the slaves to implement acceptable bus bit-width.

11. An apparatus comprising:

a slave status register accessible to read a direct message ready status bit which is set when the slave is ready to transfer data directly and accessible to read an indirect message ready bit which is set when the slave is ready to transfer data indirectly;

a slave mailbox register configured to transfer direct message data using a DMA engine if the direct message ready status bit is set and with the slave mailbox registers used for transferring message data using the DMA engine if an indirect message ready status bit is set;

a message transfer complete status interrupt at the slave configured to indicate when the transfer of the message is complete;

a slave indirect address mailbox register configured to transfer address data using the DMA engine if the indirect message ready status bit is set;

an indirect transfer message interrupt bit at the slave configured to initiate the indirect transfer; and a slave memory map configured for use with the address data to transfer data between a location indicated by the address data and the DMA engine.

* * * * *

UNITED STATES PATENT AND TRADEMARK OFFICE
CERTIFICATE OF CORRECTION

| | | |
|---|---|---|
| PATENT NO. | : 7,200,692 B2 | Page 1 of 1 |
| APPLICATION NO. | : 10/798514 | |
| DATED | : April 3, 2007 | |
| INVENTOR(S) | : Singla et al. | |

It is certified that error appears in the above-identified patent and that said Letters Patent is hereby corrected as shown below:

Title Page and Column 1 lines 1 and 2 should read:

-- PVDM (PACKET VOICE DATA MODULE) GENERIC BUS PROTOCOL --

Signed and Sealed this

Seventh Day of August, 2007

JON W. DUDAS
*Director of the United States Patent and Trademark Office*